April 10, 1956     H. H. HOPKINS     2,741,155
VARIABLE MAGNIFICATION OPTICAL SYSTEMS
Filed Sept. 10, 1952     2 Sheets-Sheet 1
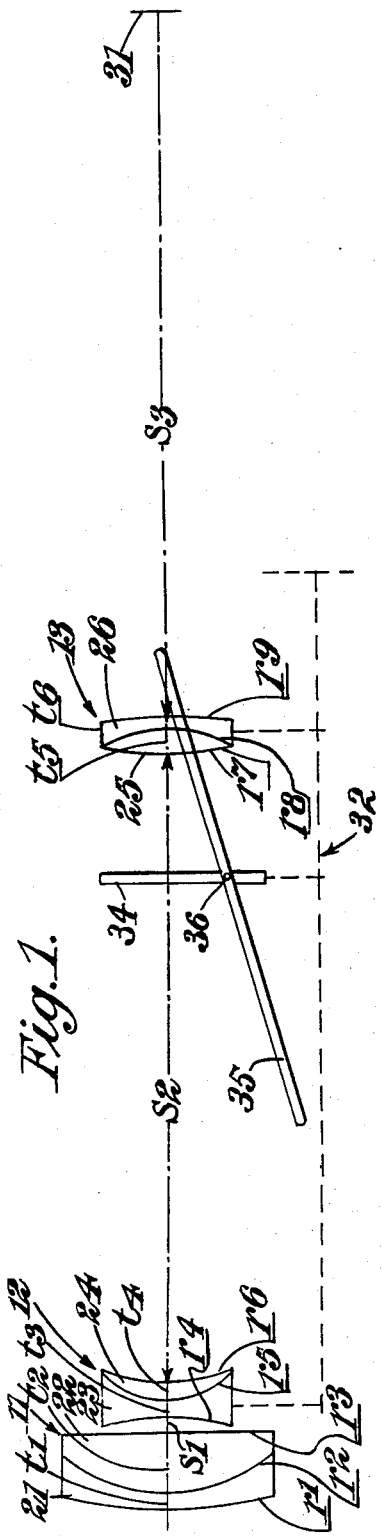
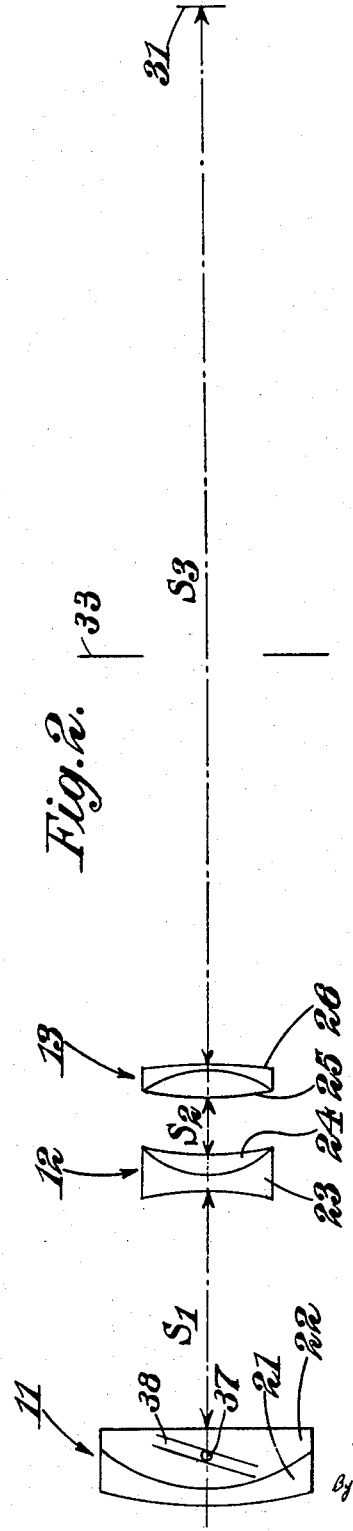
INVENTOR
Harold Horace Hopkins
By: Watson, Cole, Grindle
Watson
ATTORNEYS

United States Patent Office 2,741,155
Patented Apr. 10, 1956

2,741,155

VARIABLE MAGNIFICATION OPTICAL SYSTEMS

Harold Horace Hopkins, London, England, assignor to W. Watson & Sons Limited, London, England, a British company Application September 10, 1952, Serial No. 308,825

Claims priority, application Great Britain September 11, 1951

12 Claims. (Cl. 88—57)

The invention relates to variable magnification optical systems of the kind (hereinafter referred to as the kind described) which may be used alone or in conjunction with a further optical system (e. g. the lens system of a camera) to produce an image of continuously variable size of an object at a fixed distance from the system. Such a system may be used for example in or with a stationary cine camera or television transmitting camera in order continuously to increase or decrease the size of the image, on the film or other image receiving device, of objects in the scene towards which the camera is directed and thereby to give the impression when the film is projected, or the television receiver is viewed, that the viewpoint approaches or recedes from objects in the scene.

Examples of variable magnification optical systems of the kind described and employing four lenses are described in United States patent specifications Nos. 2,501,219, 2,514,239, 2,537,561, 2,566,889 and 2,663,223.

It is an object of the invention to provide an improved optical system of the kind described.

The invention provides a variable magnification optical system of the kind described comprising a normally stationary positive (convergent) lens, a movable negative (divergent) lens and a movable positive (convergent) lens, all arranged on a common optical axis with the said positive lenses spaced apart, the said negative lens between the said two positive lenses and spaced from at least one of them, and the movable lenses movable axially relative to the normally stationary positive lens and relative to each other, and, in combination with the lenses, magnification varying means for continuously and simultaneously moving the two movable lenses in opposite directions respectively along the optical axis according to a law such that the distance from the normally stationary lens at which the image of an object at a fixed distance from the normally stationary lens is accurately focussed remains constant, while the size of the said image is continuously varied during the operation of the magnification varying means, in which system the said two movable lenses are such that, for one final image position of the system, at one position (hereinafter referred to as their mean position) of their movement they each have simultaneously a magnification substantially equal to unity, so that the combined magnification of the two movable lenses when in that position is also substantially equal to unity, and that the image produced by the two movable lenses is erect with respect to the image formed by the normally stationary positive lens.

By the "magnification" of the system is meant, in accordance with the usage in the art, the numerical ratio of the size of the image formed by the system of a given object to the size of the object itself; it being understood that when an object, or image, or both is at an effectively substantially infinite distance from the system the size of the object and/or image referred to is the angular size.

When the object is situated at an effectively substantially infinite distance from the system the numerical ratio of the linear size of the image to the angular size of the object is numerically equal to the equivalent focal length of the system. A preferred embodiment of the invention comprises a camera lens of variable focal length and in such an embodiment the focal length of the system is accordingly numerically equal to the magnification.

In a preferred form of the system the movable lenses have focal lengths such that if they are positioned close to, or substantially in contact with, one another the combined magnification (M) produced by them is substantially equal to the positive square root of the ratio of the maximum to the minimum magnification of the complete system.

References herein to the "magnification" produced by one, or both, of the movable lenses are to be understood to mean the ratio of the linear size of the image produced by that lens, or those lenses, to the linear size of the effective object for that lens, or those lenses, an erect image (with respect to that effective object) corresponding to a positive value of magnification and an inverted image corresponding to a negative value of magnification.

The ranges of movement of the movable lenses are preferably such that at one limit of their movements they are positioned as close together as is possible subject to practical limitations, such as the usual need for supporting the movable lenses in cells which cells may prevent the lenses from coming into contact and the undesirability of the lenses coming into contact owing to the possibility of such contact damaging their glass surfaces. The movable lenses preferably have a combined magnification, M, substantially equal to the positive square root of the ratio of the maximum to the minimum magnification of the complete system at that limit of their movements, which limit is hereinafter referred to as their close limit. It then follows that if when the movable lenses are at their close limit their principal planes are substantially coincident then their focal lengths must be such that, if G is the ratio of the focal length of the movable positive lens to the focal length of the movable negative lens, then G must be that root of the equation $$\frac{4(G+1)^2}{G} = -\frac{(M-1)^2}{M}$$

which is negative, and preferably numerically greater than unity. Their principal planes will, in general, not coincide exactly at their close limit and the said condition may if necessary be met more exactly by making the value of M in the above equation slightly greater than the positive square root of the ratio of the maximum to the minimum magification of the system, instead of exactly equal to that square root.

The system is preferably designed for use with an image receiver (e. g. a film) positioned such that for the mean position of the movable lenses in their range of movement the magnification at which each movable lens is working is substantially equal to minus one. The focal length of the normally stationary positive lens is then preferably substantially equal to the geometric mean of the maximum and minimum focal lengths of the system. If $F_0$ is the focal length of the normally stationary positive lens so determined, then the focal length of the movable negative lens $F_1$, and that of the movable positive lens $F_2$, are preferably such that they are determined approximately by the equation $$F_1 = \frac{M+G}{G(M-1)} F_0$$

where M and G have the significance given to them above. These focal lengths are given only approximately by the above equations since, in practice, lenses must be given finite thicknesses and in consequence it is often not possible to make the separation between the principal planes of two lenses exactly zero. The two focal lengths $F_1$, $F_2$ can be determined more exactly by these equations if a value of M (and the corresponding value of G) is used which is slightly greater than the positive square root of the ratio of the maximum to the minimum focal lengths of the complete system.

$$F_2 = GF_1$$

The arrangement is preferably such that, if the ratio, R, of the maximum magnification of the complete system to its minimum magnification during the operation of the magnification varying means is equal to $M^2$, the movable negative lens has a magnification substantially equal to $(M+G)/(1+G)$, and the movable positive lens has a magnification substantially equal to $M(1+G)/(M+G)$ when the two movable lenses are at their close limit and each have magnifications equal respectively to the reciprocals of those quantities when they are at the other limit of their movements (hereinafter referred to as their far limit). The combined magnification of the two movable lenses is then equal to $\sqrt{R}$ at their close limit and equal to $$\frac{1}{\sqrt{R}}$$

at their far limit. The arrangement is preferably such that at the far limit of the movable lenses the movable negative lens is close to the normally stationary lens. The distance through which the movable positive lens moves during the change from the close limit to the far limit is, in the preferred arrangements, slightly greater than that through which the negative lens moves. By arranging that the magnification of each of the movable lenses at their close position is equal to the reciprocal of its magnification at their far position, the necessary amount of movement of the movable lenses is kept to a minimum. It may be shown that the magnification of each of the movable lenses at their close limit is nearly equal to the negative real fourth root of R, and similarly that each has a magnification nearly equal to the reciprocal of this quantity at their far limit, providing R is not much greater than 16. Thus, since the magnification of each movable lens varies numerically between approximately the fourth root of R and approximately the reciprocal of that root the change in magnification of each movable lens is smaller than in any prior system of the kind described, and in consequence the changes in the aberrations of the movable lenses resulting from their movements, are smaller. For this reason it is easier to obtain correction of the aberrations in a system according to this preferred form of the invention, and as a corollary a system of a particular complexity (e. g. of a given number of component lenses) can be made according to this preferred form of the invention to give a larger range of image sizes than any prior system for equally good correction of aberrations.

If the system is constructed of lenses having focal lengths determined by the above mentioned formulae, the algebraic sum of the reciprocals of the focal lengths is very small, and in consequence the so-called Petzval sum, which determines the curvature of the image, is also very small, affording a great advantage in correcting the aberrations for larger angles of view.

The aperture of the system is preferably determined by means of a stop, e. g. an apertured diaphragm. The stop may be normally stationary and may be close to the far limit position of the movable positive lens, on the side thereof remote from the normally stationary positive lens. Alternatively the stop may be arranged to move along the axis during change of magnification, e. g. by the magnification varying means, and in that case its aperture is preferably varied automatically to maintain the relative aperture of the system constant, e. g. by means of operating on the principle of the stop adjusting-means described in pending application Serial No. 236,482, now U. S. Patent No. 2,663,223 dated December 22, 1953.

In an alternative, and preferred, arrangement the stop is normally stationary and is located at an axial position between the two movable lenses at their close limit. The aperture of the stop is preferably varied automatically, as the movable lenses are moved, to maintain the relative aperture of the system substantially constant. The aperture of the stop may be arranged to vary as a linear function of the variation in the axial distance between the movable positive lens and the image position, e. g. by a mechanism operated by movement of the movable positive lens. The required variation of the aperture of the stop to maintain a constant relative aperture is not strictly a linear function as described, but variation in accordance with that linear function is sufficient for practical purposes providing the zoom ratio is not too great, e. g. not greater than about 6.

The term "normally stationary lens" is to be understood to mean a lens which remains stationary during the continuous variation of the size of an image of an object at a fixed distance from the system, and the term "normally stationary" as applied to a stop is to be understood to indicate that the stop does not move relative to the normally stationary lens under such conditions if the relative aperture of the system is to be maintained constant.

The said normally stationary lens may be mounted for adjusting movement along the optical axis and focus-adjustment means indicated as a convention arrangement of a pin 37 and inclined slot 38 in Figure 2 may be provided and may be operable, independently of the magnification-varying means, to move the normally stationary lens to effect focussing of the system as described in British specification No. 639,611 and United States patent specification No. 2,566,889. It will be appreciated that the focus-adjustment means may be operated at the same time as the magnification-varying means if desired, e. g. to keep in focus an object which moves during the variation of magnification.

Each of the lenses may be a simple lens or a compound lens comprising two or more component lenses in contact or spaced apart by a fixed distance or fixed distances, one or more of which component lenses may comprise two or more lens elements in contact.

For systems in which R is greater than about 2 it is preferred to employ compound lenses.

In a preferred arrangement, the normally stationary positive lens comprises an achromatic doublet lens; the movable negative lens comprises two negative achromatic doublets spaced at a fixed distance apart and symmetrical about the mid-point of that distance; and the movable positive lens comprises two positive achromatic doublets spaced at a fixed distance apart and symmetrical about the mid-point of that distance. The normally stationary positive lens may, in this arrangement, be corrected for spherical aberration and coma. The movable positive lens, when in its far position will have aberrations equal to those which it has when in its close position, because of the symmetry of this lens. Hence, if for example it is corrected for coma and spherical aberration at its close position it will also be corrected automatically for these aberrations when at its far position. Similarly, the movable negative lens may be so corrected at both its close and far limits. At their mean positions each of the movable lenses will have a magnification equal to minus 1 and (since they are of symmetrical construction) the coma will be zero.

It will be understood that other aberrations, e. g. astigmatism, could be chosen to be corrected separately in each of such symmetrical movable lenses at their close position, and thereby be also corrected at their far position.

The principles of the above mentioned corrections are described in or are applicable to pending application Serial No. 236,482.

A simple or compound lens may be provided, e. g. at the stop or between it and the image plane, in order to change the range of focal lengths, and consequently the range or variation of magnification, of the system, and/or the location of the image formed by the system.

A specific example of a camera lens system embodying the invention will now be described by way of example and with reference to the accompanying drawings in which:

Figure 1 is a diagram of the camera lens system showing the movable lenses at their far limit;

Figure 2 is a diagram showing the component lenses at their close limit, and

Figure 3:
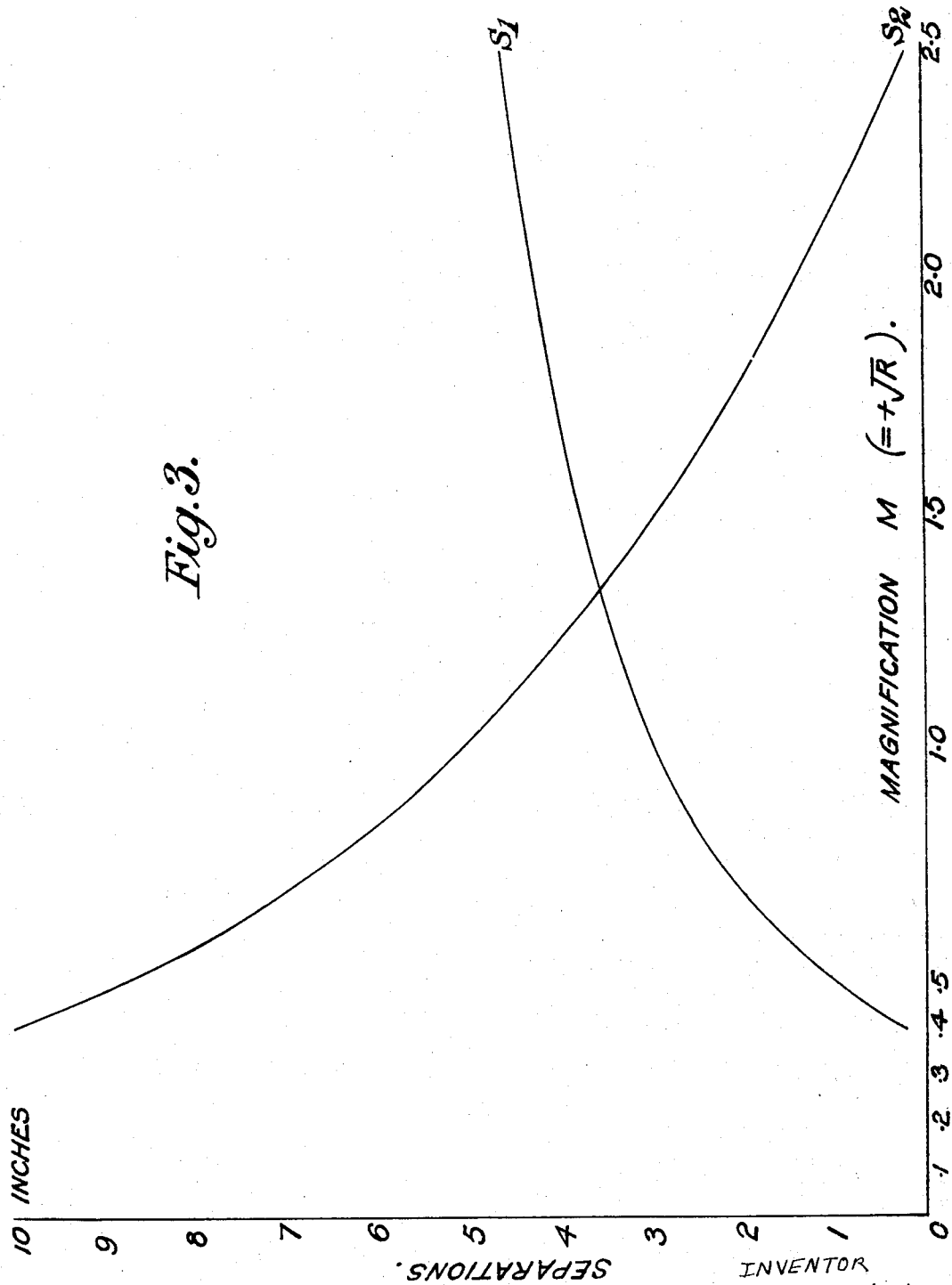
Figure 3 is a graph showing the law of movement of the movable lenses.

In this example, the normally stationary positive lens 11, the movable negative lens 12 and the movable positive lens 13 are each in the form an achromatic doublet lens and their radii and glass thicknesses are as indicated in the following table, the radii $r_1 r_2 r_3 r_4 r_5 r_6 r_7 r_8 r_9$ being indicated in Figure 1 and the thicknesses $t_1 t_2 t_3 t_4 t_5 t_6$ being the axial thicknesses of the glass components 21, 22, 23, 24, 25, and 26 respectively. Similarly, $u_1 u_2 u_3 u_4 u_5 u_6$ are the respective refractive indices, and $V_1 V_2 V_3 V_4 V_5$ and $V_6$ the dispersions, of the components 21 to 26.

| | | | |
|---|---|---|---|
| $r_1=6.0569$ | $t_1=0.2618$ | $u_1=1.6258$ | $V_1=35.7$ |
| $r_2=2.6786$ | $t_2=0.9337$ | $u_2=1.5722$ | $V_2=57.7$ |
| $r_3=$infinity | | | |
| $r_4=-3.7863$ | $t_3=0.2019$ | $u_3=1.5190$ | $V_3=60.4$ |
| $r_5=1.4423$ | $t_4=0.3029$ | $u_4=1.7004$ | $V_4=30.3$ |
| $r_6=2.9637$ | | | |
| $r_7=5.3832$ | $t_5=0.2342$ | $u_5=1.5722$ | $V_5=57.7$ |
| $r_8=1.7048$ | $t_6=0.0781$ | $u_6=1.6055$ | $V_6=38.0$ |
| $r_9=9.2069$ | | | |

The film, or like image receiving surface, is located at 31, and the law of movement of the movable lenses is such that the separations $S_1$ and $S_2$ between the lenses, and the separation $S_3$ between the movable positive lens 26 and the image receiving surface 31, vary as stated in the following table and as shown in Figure 3, when the magnification varying means are operated.

| M | $S_1$ | $S_2$ | $S_3$ |
|---|---|---|---|
| 0.3997 | 0.2465 | 9.9325 | 10.8813 far limit |
| 0.5069 | 1.0797 | 8.6130 | 11.3676 |
| 0.6324 | 1.7639 | 7.4288 | 11.8676 |
| 0.7741 | 2.3192 | 6.3735 | 12.3676 |
| 0.8830 | 2.6487 | 5.6941 | 12.7176 |
| 1.0000 | 2.9386 | 5.0541 | 13.0676 mean position |
| 1.1325 | 3.2090 | 4.4142 | 13.4372 |
| 1.2919 | 3.4750 | 3.7347 | 13.8506 |
| 1.5812 | 3.8467 | 2.6794 | 14.5342 |
| 1.9729 | 4.2077 | 1.4952 | 15.3574 |
| 2.5018 | 4.5478 | 0.1757 | 16.3369 close limit |

In this example:
The zoom ratio, R=6.26
The maximum focal length=29.91
The minimum focal length=4.78
The focal length of lens 11=11.96
The focal length of lens 12=−4.00
The focal length of lens 13=6.6
The overall length from the surface $r_1$ to the image receiving surface 31=23

All the above mentioned linear dimensions are in inches. Radii of surfaces are stated as positive when they are convex to light entering from the object and negative when concave to such light.

The magnification varying means for moving the lenses in accordance with the law of movement defined in Figure 3 are indicated diagrammatically at 32 in Figure 1. A stationary diaphragm stop 33 may be provided, as hereinbefore mentioned, and as shown in Figure 2. An alternative diaphragm stop 34 arranged to be moved, by the magnification varying means 32, along the axis during change of magnification is shown in Figure 1, its aperture being varied automatically by an inclined slot 35 acting on the operating lever 36 of the diaphragm.

It will be appreciated that the invention is not restricted to the details of the arrangements mentioned specifically herein. For instance, each of the movable lenses may alternatively consist of a simple lens.

The invention permits the construction of an accurately focussing variable magnification system employing only three lenses and which may be optically corrected to a very high degree. The Petzval sum, which determines the field curvature, can be made small and the incidence heights of the principal rays at the movable lenses may be made small.

When the movable lenses are at their close limit they have jointly a resultant negative power. In consequence, the system is (for that position of the movable lenses) of a telephoto form, the overall length from the front component to the focal plane, thereby being less than in a fixed focus lens of normal construction. This constitutes another advantage of the system according to the invention.

When the preferred form of the invention is employed the total axial length from the normally stationary positive lens to the image receiving plane is approximately equal to $(2-M+G/M)F_0/(1+G)$, where $F_0$ is the focal length of the normally stationary positive lens. As an example, when $R=16$ (that is to say, the system has a so-called "zoom ratio" of 16:1), M is equal to plus 4 at the close limit, G is equal to minus 2 and the total axial length in this case is equal to about $2\frac{1}{2}F_0$, whereas the maximum focal length of the system is in this case about $4F_0$.

The invention is not restricted to systems employing only two movable lenses. For example, a second pair of movable lenses, similar to those described and having similar movements, may be arranged between the far limit of the movable positive lens and the image produced by that lens. One or more additional pairs of movable lenses may be added.

When two pairs of movable lenses are employed, for instance, the variation of magnification is achieved by the combined effects of moving simultaneously four lenses (instead of two), each of whose separate magnifications can be made to vary between approximately the negative real eighth root of R and approximately the reciprocal of that quantity. In a preferred form the two movable negative lenses are identical in respect of their focal lengths and laws of movement and the two movable positive lenses are also identical in respect of their focal lengths and laws of movement, but the pairs of movable lenses are not otherwise necessarily of the same construction. This leads to a simple mechanical arrangement, in which, for example, the two negative lenses are attached to, and are moved by, a common mechanical member, and the two positive lenses are similarly attached to, and are moved by, another common mechanical member. By this means the change in the distance between the object and image for any one of the movable lenses may, in systems of not too large zoom ratio, be made so small that strictly linear movements may be imparted to these lenses, and nevertheless maintain the image sufficiently well focussed in a constant focal plane, providing the relative aperture is not too large.

I claim:

1. A variable magnification optical system comprising a normally stationary positive lens, a movable negative lens and a movable positive lens, all arranged on a common optical axis with said positive lenses spaced apart, the said negative lens between the said two positive lenses and spaced from at least one of them, and the movable lenses movable axially relative to the normally stationary positive lens and relative to each other, and, in combination with the said lenses, magnification varying means for continuously and simultaneously moving the two movable lenses in opposite directions respectively along the optical axis according to a law such that the distance from the normally stationary lens at which the image of an object at a fixed distance from the normally stationary lens is accurately focussed remains constant, while the size of the said image is continuously varied during the operation of the magnification varying means, in which system the two movable lenses are such that, for one final image position of the system, at one position of their movement, they each have simultaneously a magnification substantially equal to unity, whereby the combined magnification of the two movable lenses when in that position is also substantially equal to unity and the image produced by the two movable lenses is erect with respect to the image formed by the normally stationary positive lens.

2. A variable magnification optical system according to claim 1, wherein the said movable lenses have focal lengths such that if the said movable lenses are positioned close to one another the combined magnification produced by them is substantially equal to the positive square root of the ratio of the maximum to the minimum magnification of the complete system.

3. A variable magnification optical system according to claim 1, wherein the ranges of movement of the said movable lenses are such that at one limit of their movements, said limit being referred to herein as their close limit, they are positioned as close together as is possible subject to practical limitations.

4. A variable magnification optical system according to claim 3, wherein the movable lenses have, when at their said close limit, a combined magnification substantially equal to the positive square root of the ratio of the maximum to the minimum magnification of the complete system.

5. A variable magnification optical system according to claim 4, wherein the focal lengths of the movable lenses are such that if the ratio of the focal length of the movable positive lens to the focal length of the movable negative lens is denoted by G then the value of G is substantially equal to that root of the equation $$\frac{4(G+1)^2}{G} = \frac{-(M-1)^2}{M}$$

which is negative, M denoting the combined magnification of the movable lenses when at their said close limit.

6. A variable magnification optical system according to claim 5, wherein the focal length of the normally stationary positive lens is substantially equal to the geometric mean of the maximum and minimum focal lengths of the system.

7. A variable magnification optical system according to claim 6, wherein the focal lengths of the movable lenses are determined approximately by the equations $$F_1 = \frac{M+G}{G(M-1)} F_0$$

and $$F_2 = GF_1$$

where $F_0$ is the focal length of the normally stationary positive lens, $F_1$ is the focal length of the movable negative lens, and $F_2$ is the focal length of the movable positive lens.

8. A variable magnification optical system according to claim 7, wherein the magnification of each of the movable lenses when at their close limit is equal to the reciprocal of its magnification when the movable lenses are at the other limit of their movements, herein referred to as their far limit.

9. A variable magnification optical system according to claim 8, wherein the movable negative lens has a magnification substantially equal to $(M+G)/(1+G)$ and the movable positive lens has a magnification substantially equal to $M(1+G)/(M+G)$ when the two movable lenses are at their said close limit, and each have magnifications equal respectively to the reciprocals of those quantities when they are at their said far limit.

10. A variable magnification optical system comprising in combination a normally stationary positive lens, a movable negative lens and a movable positive lens, all arranged on a common optical axis with said positive lenses spaced apart, the said negative lens between the said two positive lenses and spaced from at least one of them, and the movable lenses movable axially relative to the normally stationary positive lens and relative to each other, image receiving means for receiving a focussed image formed by light after passing through said lenses, which image receiving means are at a fixed distance from the stationary lens and determine the final image position for the system, the movable lenses being between the normally stationary lens and the image receiving means, and magnification varying means for continuously and simultaneously moving the two movable lenses in opposite directions respectively along the optical axis according to a law such that the image at the image receiving means of an object at a fixed distance from the normally stationary lens remains accurately focussed while the size of the said image is continuously varied during the operation of the magnification varying means, in which system the two movable lenses have focal lengths such that, at one position of their movement, they each have simultaneously a magnification substantially equal to unity, whereby the combined magnification of the two movable lenses when in that position is also substantially equal to unity and the image produced by the two movable lenses is erect with respect to the image formed by the normally stationary positive lens.

11. A variable magnification optical system comprising a normally stationary positive lens, a movable negative lens and a movable positive lens, all arranged on a common optical axis with said positive lenses spaced apart, the said negative lens between the said two positive lenses and spaced from at least one of them, and the movable lenses movable axially relative to the normally stationary positive lens and relative to each other, and, in combination with the said lenses, magnification varying means for continuously and simultaneously moving the two movable lenses in opposite directions respectively along the optical axis according to a law such that the distance from the normally stationary lens at which the image of an object at a fixed distance from the normally stationary lens is accurately focussed remains constant, while the size of the said image is continuously varied during the operation of the magnification varying means, in which system the two movable lenses are such that, for one final image position of the system, at one position of their movement, they each have simultaneously a magnification substantially equal to unity, whereby the combined magnification of the two movable lenses when in that position is also substantially equal to unity and the image produced by the two movable lenses is erect with respect to the image formed by the normally stationary positive lens, the ranges of movement of the said movable lenses are such that at one limit of their movements, said limit being referred to herein as their close limit, they are positioned as close together as is possible subject to practical limitations, the movable lenses have, when at their close limit, a combined magnification substantially equal to the positive square root of the ratio of the maximum to the minimum magnification of the complete system, and the magnification of each of the movable lenses when at their close limit is equal to the reciprocal of its magnification when the movable lenses are at the other limit of their movements.

12. A variable magnification optical system comprising in combination a normally stationary positive lens, a movable negative lens and a movable positive lens, all arranged on a common optical axis with said positive lenses spaced apart, the said negative lens between the said two positive lenses and spaced from at least one of them, and the movable lenses movable axially relative to the normally stationary positive lens and relative to each other, image receiving means for receiving a focussed image formed by light after passing through said lenses, which image receiving means are at a fixed distance from the stationary lens and determine the final image position for the system, the movable lenses being between the normally stationary lens and the image receiving means, and magnification varying means for continuously and simultaneously moving the two movable lenses in opposite directions respectively along the optical axis according to a law such that the image at the image receiving means of an object at a fixed distance from the normally stationary lens remains accurately focussed while the size of the said image is continuously varied during the operation of the magnification varying means, in which system the two movable lenses have focal lengths such that, at one position of their movement, they each have simultaneously a magnification substantially equal to unity, whereby the combined magnification of the two movable lenses when in that position is also substantially equal to unity and the image produced by the two movable lenses is erect with respect to the image formed by the normally stationary positive lens, ranges of movement of the said movable lenses are such that at one limit of their movements, said limit being referred to herein as their close limit, they are positioned as close together as is possible subject to practical limitations, the movable lenses have, when at their close limit, a combined magnification substantially equal to the positive square root of the ratio of the maximum to the minimum magnification of the complete system, and the magnification of each of the movable lenses when at their close limit is substantially equal to the reciprocal of its magnification when the movable lenses are at the other limit of their movements.

References Cited in the file of this patent

UNITED STATES PATENTS

| | | |
|---|---|---|
| 2,130,347 | Holst | Sept. 20, 1938 |
| 2,159,394 | Mellor et al. | May 23, 1939 |
| 2,165,341 | Capstaff et al. | July 11, 1939 |
| 2,235,364 | Grammatzki | Mar. 18, 1941 |
| 2,353,565 | Kaprelian | July 11, 1944 |
| 2,454,686 | Back | Nov. 23, 1948 |
| 2,496,069 | Sachtleben | Jan. 31, 1950 |
| 2,514,239 | Hopkins | July 4, 1950 |
| 2,515,104 | Walker | July 11, 1950 |

FOREIGN PATENTS

| | | |
|---|---|---|
| 440,397 | Great Britain | Sept. 26, 1934 |
| 536,706 | Great Britain | May 23, 1941 |